United States Patent
Chikamatsu et al.

(10) Patent No.: US 7,954,609 B2
(45) Date of Patent: Jun. 7, 2011

(54) DAMPING FORCE GENERATING MECHANISM FOR SHOCK ABSORBER

(75) Inventors: Satoshi Chikamatsu, Tokyo (JP); Kouichi Watanabe, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 789 days.

(21) Appl. No.: 12/003,302

(22) Filed: Dec. 21, 2007

(65) Prior Publication Data

US 2008/0149438 A1      Jun. 26, 2008

(30) Foreign Application Priority Data

Dec. 26, 2006   (JP) ................. 2006-348838

(51) Int. Cl.
*F16F 9/49*      (2006.01)
*F16F 9/34*      (2006.01)

(52) U.S. Cl. .............. 188/280; 188/282.1; 188/282.5; 188/322.13; 188/313; 188/317; 188/282.8

(58) Field of Classification Search .............. 188/280, 188/322.13, 322.14, 322.15, 284, 266.1, 188/266.2, 266.5, 266.6, 281, 282.1, 282.5, 188/282.6, 282.8, 282.9, 313, 316, 317, 320

See application file for complete search history.

(56) References Cited

U.S. PATENT DOCUMENTS

| 7,699,148 B2 * | 4/2010 | Forster | 188/322.13 |
| 2009/0065315 A1 * | 3/2009 | Chikamatsu | 188/313 |

FOREIGN PATENT DOCUMENTS

| DE | 10041199 C1 | 11/2001 |
| DE | 102004050732 A1 | 6/2005 |
| JP | 09-291961 A | 11/1997 |

* cited by examiner

*Primary Examiner* — Thomas J Williams
(74) *Attorney, Agent, or Firm* — Rabin & Berdo, PC

(57) ABSTRACT

A damping valve (10) resists a flow of fluid from a first fluid chamber (41) to a second fluid chamber (42) which are separated by a piston (1). A partitioning member (24, 27-29, 52) partitions an inflow space (A, B) of a passage (2) in the first fluid chamber (41). A spool (17, 31, 51) decreases a flow cross-sectional area of a flow path from the first fluid chamber (41) into the inflow space (A, B) according to a differential pressure between the fluid chambers. By ensuring a gap between the outer circumference of the valve disk (1) and the partitioning member (24, 27-29, 52) which permanently allows fluid to flow from the first chamber (41) into the inflow space (A, B), the damping force characteristic in a high speed region of piston displacement can be set independently of the damping force characteristic in other regions.

11 Claims, 10 Drawing Sheets

DAMPING FORCE GENERATING MECHANISM FOR SHOCK ABSORBER

FIELD OF THE INVENTION

This invention relates to a damping force generating mechanism provided in a shock absorber.

BACKGROUND OF THE INVENTION

A hydraulic shock absorber for a vehicle comprises, for example, two fluid chambers separated in the interior of a cylinder by a piston, and a passage provided through the piston to connect these fluid chambers. A damping valve in the form of a leaf valve is provided at an outlet of the passage to generate a damping force relative to displacement of the piston. The leaf valve generally comprises a plurality of stacked leaves having a fixed inner circumferential part, and lifts an outer circumferential part to open the passage according to the differential pressure between the upstream and downstream sides of the leaves. With this construction, the damping force generated by the leaf valve tends to be excessive when in a middle to high speed region of piston displacement.

In order to improve the damping force characteristic of a leaf valve, JPH09-291961A, published by the Japan Patent Office in 1997, proposes a leaf valve in which the inner circumferential part is not fixed but supported resiliently by a coil spring.

Referring to FIG. 10, in a shock absorber in which this leaf valve is installed, a cylindrical piston nut N is secured onto a tip of a piston rod R penetrating the piston P. The leaf valve L closing an outlet of a passage Po which passes through the piston P is fitted on the outer circumference of the piston nut N such that it can displace in an axial direction. A coil spring S an end of which is supported by the piston nut N, resiliently supports the inner circumferential part of the leaf valve L via a push member M.

When the piston P moves upward in the figure, working oil in an oil chamber above the piston P flows into an oil chamber below the piston P via the passage Po and a damping force is generated due to a flow resistance of the leaf valve L at the outlet of the passage Po. When the piston displacement speed is in a low speed region, the leaf valve L bends the outer circumferential part downward in the figure from the inner circumferential part supported by the push member M. As the piston displacement speed reaches a middle to high speed region, the pressure in the passage Po becomes greater than the resilient force of the coil spring S such that the leaf valve L retreats from the piston P downward in an axial direction together with the push member M. As a result, the opening area of the leaf valve L becomes large so that the damping force is prevented from becoming excessive. As shown in FIG. 11, the damping force increase is gradual with respect to an increase in the piston displacement speed even in the middle to high speed region.

SUMMARY OF THE INVENTION

This valve structure is effective in suppressing an excessive increase in the damping force generated in the middle to high speed region of piston displacement. Since the leaf valve L is kept in a retreated position once the piston displacement speed has reached the middle to high speed region of piston displacement, the damping force characteristic does not vary as long as the piston displacement speed varies in this region. When a spring load is set to obtain a preferable damping force in the middle speed region, therefore, the damping force generated in the high speed region may become insufficient.

It is therefore an object of this invention to provide a damping force generating mechanism which realizes different damping force characteristics in a middle speed region and a high speed region of piston displacement such that a preferable damping force is obtained in the respective speed regions.

In order to achieve the above object, this invention provides a damping force generating mechanism for a shock absorber which comprises a first fluid chamber, a second fluid chamber, a valve disk which separates the first fluid chamber and the second fluid chambers, and a passage formed through the valve disk to connect the first fluid chamber and the second fluid chambers.

The mechanism comprises a damping valve which exerts a resistance on a flow of fluid in the passage from the first fluid chamber to the second fluid chamber, a partitioning member which covers the valve disk and partitions an inflow space into the passage in the first fluid chamber, a first flow path connecting the first fluid chamber and the inflow space, a spool which decreases a flow cross-sectional area of the first flow path when a fluid pressure in the first fluid chamber increases beyond a fluid pressure in the second fluid chamber by more than a predetermined pressure, and a second flow path formed by the partitioning member and facing the outer circumference of the valve disk so as to allow fluid to flow from the first fluid chamber to the inflow space.

The details as well as other features and advantages of this invention are set forth in the remainder of the specification and are shown in the accompanying drawings.

DESCRIPTION OF THE PREFERRED EMBODIMENTS

Figure 1:
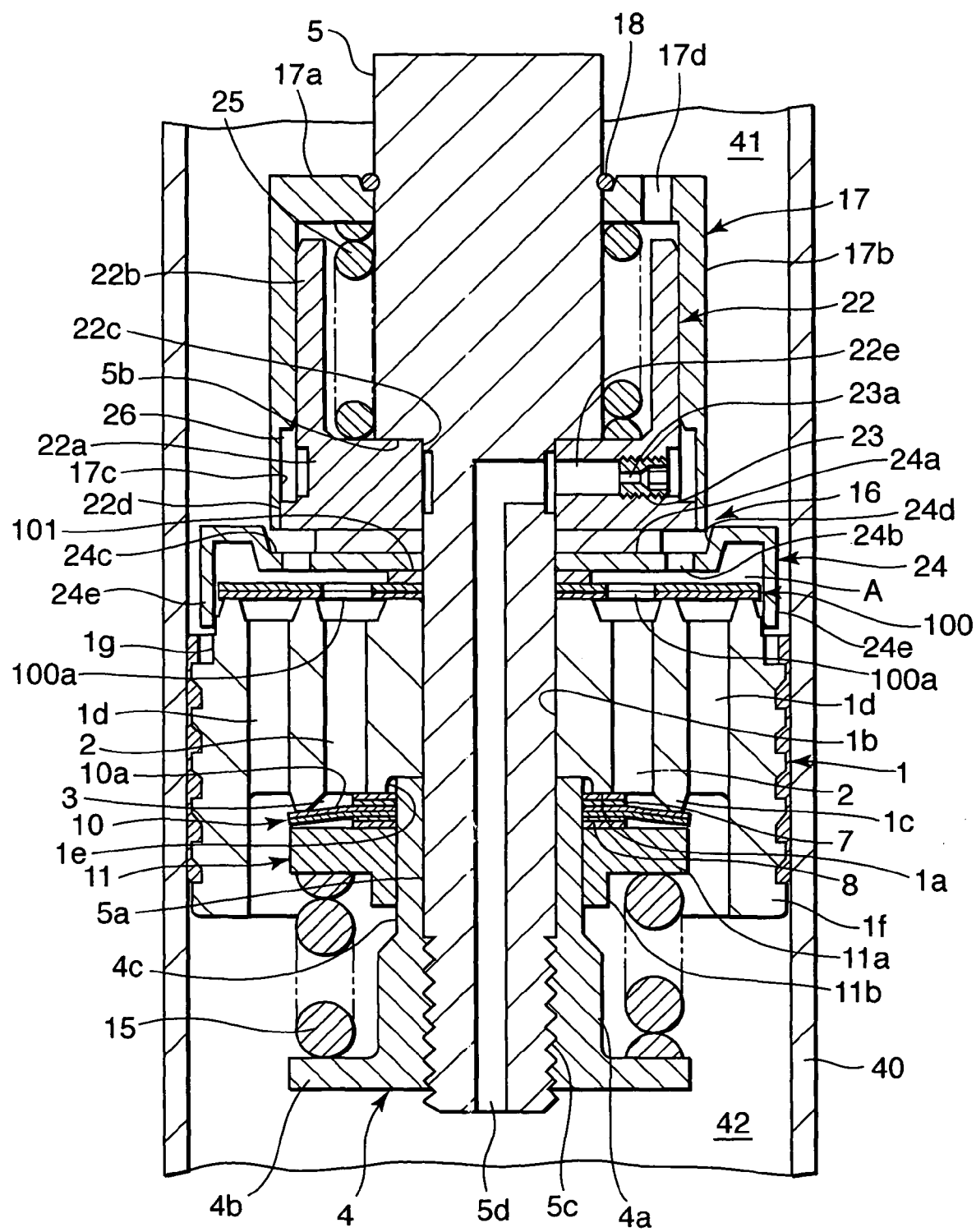
FIG. 1 is a longitudinal sectional view of essential parts of a shock absorber including a damping force generating mechanism according to this invention.

Referring to FIG. 1 of the drawings, a hydraulic shock absorber for a vehicle comprises a cylinder 40, a piston 1 enclosed in the cylinder 40, as a valve disk, so as to be free to slide in an axial direction, and a piston rod 5 connected to the piston 1 and projecting axially from the cylinder 40.

The piston rod 5 has a small diameter part 5a formed at its lower end via a step 5b. The small diameter part 5a penetrates a through-hole 1b formed in the piston 1. A cylindrical part 4a of a piston nut 4 is screwed onto a male screw part formed at a lower end of the small diameter part 5a. A outer circumferential part 1f of the piston 1 slides on the inner circumference of the cylinder 40. The piston 1 has a closed-end cylindrical form and is fixed to the small diameter part 5a in a bottom-up state by a piston nut 4.

The interior of the cylinder 40 is separated by the piston 1 into a first oil chamber 41 located above the piston 1 and a second oil chamber 42 located below the piston 1. Working oil is enclosed in the first oil chamber 41 and the second oil chamber 42. The first oil chamber 41 and the second oil chamber 42 communicate with each other via passages 2 and passages 1d formed respectively as through-holes in the piston 1. Although not shown in the drawings, a reservoir or an air chamber is provided inside or outside the cylinder 40 as a known component of a hydraulic shock absorber to compensate for capacity variation in the cylinder 40 due to elongation and contraction of the piston rod 5 with respect to the cylinder 40.

A damping valve 100 is provided at openings of the passages 1d formed on an upper end face of the piston 1 facing the first oil chamber 41. The damping valve 100 generates a damping force during contraction of the shock absorber, in which the piston 1 displaces downward in the figure, by resisting a flow of working oil from the shrinking second oil chamber 42 to the expanding first oil chamber 41 through the passages 1d. The damping valve 100 is constituted by a leaf valve and also functions as a check valve that prevents a reverse flow in the passages 1d. Holes 100a are formed so that the damping valve 100 does not prevent the working oil from flowing through the passages 2.

A damping valve 10 is provided at openings 3 of the passages 2 formed on a lower end face 1a of the piston 1 facing the second oil chamber 42. The piston 1 has a skirt portion at its lower end and a space surrounded by the skirt portion is used to accommodate the damping valve 10. Owing to this construction, the entire length of a piston part of the shock absorber from the upper end face of the piston 1 to the lower end of the piston nut 4 can be shortened while ensuring the length of the sliding surface of the piston 1.

The damping valve 10 generates a damping force during elongation of the shock absorber in which the piston 1 displaces upward in the figure, by resisting the flow of working oil from the shrinking first oil chamber 41 to the expanding second oil chamber 42 through the passages 2. The damping valve 10 also functions as a check valve which prevents a reverse flow in the passages 2.

The damping valve 10 is constituted by a leaf valve that has a plurality of stacked leaves covering the openings of the passages 2. More specifically, the damping valve 10 comprises a washer 7, the leaves 10a, a washer 8, a push member 11, and a coil spring 15.

The washer 7, the plural leaves 10a, the washer 8, and the push member 11 are fitted on the outer circumference of a small diameter part 4c of the piston nut 4 which is formed continuously with the cylindrical part 4a and projects upward therefrom. The washer 7 is in contact with the lower end face 1a of the piston 1. The leaves 10a are gripped between the washers 7 and 8. The push member 11 applies a resilient force of the coil spring 15 upward to the washer 8.

The push member 11 comprises a cylindrical part 11b which slides on the outer circumference of the small diameter part 4c and a disk part 11a which extends in a radial direction from the top end of the cylindrical part 11b. The coil spring 15 is interposed between the disk part 11a and a flange 4b which is formed at the bottom of the cylindrical part 4a of the piston nut 4.

The cylindrical part 11b has a function of centering the coil spring 15 and thereby ensuring the resilient force of the coil spring 15 to be applied evenly to the push member 11. It should be noted however that the cylindrical part 11b can be omitted.

A circular valve seat 1c projecting downward is formed on the lower end face 1a of the piston 1 to surround the openings of the passages 2 and face the outer circumference of the leaves 10a. The damping valve 10 closes the openings 3 of the passages 2 by causing the leaves 10a to be seated on the valve seat 1c. Further, although not shown in the figure, the leaves 10a have a minute notch or minute notches on the outer circumference that connects the passages 2 and the second oil chamber 42 even when the openings 3 are closed by the leaves 10a. It is also possible to form a minute orifice or minute orifices on the valve seat 1c by stamping instead of providing a notch or notches on the leaves 10a. Providing such a passage or passages having a minute flow sectional area in the damping valve is known in the art.

The number of the leaves 10a depends on the required damping force characteristic, or in other words the required relationship between the piston displacement speed and the generated damping force. A single leaf may be used depending on the required damping force characteristic. Further, it is possible to stack plural leaves 10a having different diameters depending on the required damping force characteristic.

According to the construction of the damping valve 10 as described above, the inner circumferential part of the leaves 10a is pressed against the lower end face 1a of the piston 1 by the push member 11 that applies the resilient force of the coil spring 15. Herein, the thickness of the washer 7 is set to be smaller than the distance from the lower end face 1a of the piston 1 to the crest of the valve seat 1c in the axial direction, thereby providing an initial bend to the leaves 10a.

By regulating the amount of the initial bend, the opening pressure with which the leaves 10a are lifted off the valve seat 1c to open the passages 2 can be regulated. The amount of the initial bend can be regulated by altering the thickness of the washer 7 or stacking a plurality of the washers 7. The amount of the initial bend should therefore be set such that the best damping force characteristic is obtained for the vehicle that uses the shock absorber. The washer(s) 7 may be omitted depending on the distance in the axial direction from the lower end face 1a to the crest of the valve seat 1c.

A disc spring, leaf spring, or a resilient material such as rubber may be used instead of the coil spring 15 to apply a resilient force to the leaves 10a.

The shock absorber further comprises a pressure responsive throttle 16 provided with a partitioning member 24 and a spool 17 so as to provide a different damping force characteristic in the high speed region of piston displacement to the middle speed region thereof.

A washer 101, the partitioning member 24, and a pressure chamber partitioning member 22 are disposed above the piston 1. These members are fitted on the outer circumference of the small diameter part 5a of the piston rod 5 in this order from above such that the pressure chamber partitioning member 22 is in contact with the step 5b and gripped between the step 5b and the piston nut 4 together with the piston 1. The piston 1 has a recess 1e on the lower end face 1a to accommodate the tip of the small diameter part 4 of the piston nut 4.

The partitioning member 24 is formed into a cylindrical shape which covers an upper end 1g of the piston 1. A cylindrical lower end 24e of the partitioning member 24 is located nearby the outer circumference of the upper end 1g of the piston 1. A circular recess is formed on an upper end face 24a of the partitioning member 24. According to this construction, the partitioning member 24 delimits an inflow space A of working oil into the passages 2 in the first chamber 41 above the piston 1.

The inflow space A communicates with the passages 2 permanently via the holes 100a in the damping valve 100. The inflow space A also communicates with the first oil chamber 41 via communicating holes 24b serving as a first flow path, which are formed through the partitioning member 24 in the vicinity of the outer circumference of the recess. Further, the inflow space A communicates with the first oil chamber 41 permanently via a minute annular gap serving as a second flow path, which is located between the lower end 24e and the outer circumference of the upper end 1g of the piston 1.

The pressure chamber partitioning member 22 is formed into a closed-end cylindrical shape. The small diameter part 5a of the piston rod 5 passes through a through-hole 22c formed in the center of a bottom portion 22a of the pressure chamber partitioning member 22. The bottom portion 22a is gripped between the recess of the partitioning member 24 and the step 5b. The diameter of the bottom portion 22a which comes into contact with the recess of the partitioning member 24 is made smaller than that of the other part of the pressure chamber partitioning member 22 so as not to block up the communicating holes 24b. The pressure chamber partitioning member 22 comprises a cylindrical portion 22b opening upward and a flange portion 22d extending radially from the bottom portion 22a.

The spool 17 is fitted onto the outer circumference of the piston rod 5 so as to be free to slide in the axial direction. The spool 17 comprises a bottom 17a which the piston rod 5 penetrates and a cylindrical part 17b extending downward from the outer circumference of the bottom 17a. The cylindrical part 17b is fitted onto the outer circumference of the cylindrical portion 22b of the pressure chamber partitioning member 22. An enlarged inner diameter part 17c is formed on the inside of a lower end of the cylindrical part 17b. The enlarged inner diameter part 17c is fitted onto the outer circumference of the flange part 22d of the pressure chamber partitioning member 22 and has a tip facing an annular valve seat 24c formed in the vicinity of a slanted wall face 24d which forms the recess on the partitioning member 24. The slanted wall face 24d has a conical shape which decreases in diameter downward and causes an annular gap formed between the tip of the enlarged inner diameter part 17c and the slanted wall face 24d to decrease gradually as the tip of the enlarged inner diameter part 17c approaches the annular valve seat 24c.

According to the above construction, a pressure chamber 26 having a ring-shaped horizontal cross-section is formed between the enlarged inner diameter part 17c of the spool 17 and the cylindrical portion 22b of the pressure chamber partitioning member 22

In order to introduce fluid pressure from the second oil chamber 42 into the pressure chamber 26, a pilot passage 5d is formed through the small diameter part 5a of the piston rod 5. Further, a port 22e connecting the pilot passage 5d to the pressure chamber 26 is formed in the pressure chamber partitioning member 22 in a radial direction. An orifice 23a is provided in the port 22e. The orifice 23a is formed in a plug 23 screwed into the inner circumference of the port 22e.

A coil spring 25 is interposed between the spool 17 and the pressure chamber partitioning member 22 in a position surrounding the piston rod 5. An upper end of the coil spring 25 is supported by the bottom 17a of the spool 17. A lower end of the coil spring 25 is supported by the bottom portion 22a of the pressure chamber partitioning member 22.

The coil spring 25 applies a resilient force to the spool 17 in a direction to cause the spool 17 to retreat from the partitioning member 24, or in other words a direction for supplementing the action of the pressure in the pressure chamber 26. Displacement of the spool 17 in this direction is limited by a stop ring 18 fitted onto the outer circumference of the piston rod 5. This position of the spool 17 is expressed as a retreated position.

A space delimited by the spool 17, the piston rod 5 and the pressure chamber partitioning member 22 is used to accommodate the coil spring 15 and is permanently connected to the first oil chamber 41 via a communicating hole 17d penetrating the bottom 17a of the spool 17, thereby preventing the working oil enclosed in this space from locking the axial displacement of the spool 17.

The pressure in the first oil chamber 41 pushes the spool 17 downward due to a difference in the upward-facing pressure receiving area and the downward-facing pressure receiving area of the spool 17. On the other hand, the pressure in the pressure chamber 26 and the resilient force of the coil spring 25 act upward on the spool 17. The spool 17, when displacing downward, causes the tip of the enlarged inner diameter part 17c to approach the partitioning member 24 such that the annular gap formed between the tip of the enlarged inner diameter part 17c and the inclined wall face 24d decreases gradually. As a result, the flow resistance to the working oil flowing from the first oil chamber 41 to the second oil chamber 42 via the annular gap increases. The downward displacing spool 17 finally causes the tip of the enlarged inner diameter part 17c to be seated on the annular valve seat 24c on the partitioning member 24 such that the flow of working oil from the first oil chamber 41 into the second oil chamber 42 via the annular gap is shut off.

The damping valve 10 and the pressure-responsive throttle 16 function as described below.

When the piston 1 displaces upward in the cylinder 40, or in other words when the shock absorber elongates, the first oil chamber 41 shrinks and the second oil chamber 42 expands. According to this action, the working oil in the first oil chamber 41 flows into the second oil chamber 42 via the inflow space A, the passages 2, and the damping valve 10.

When the piston displacement speed is very low, the opening pressure acting on the damping valve 10 is too low to cause the leaves 10a, which are under the initial bend, to open the passages 2. The working oil in the passages 2 flows into the second oil chamber 42 via the notch(es) formed in the leaves 10a or the orifice(s) formed in the valve seat 1c as described above. Since the flow rate of the working oil flowing into the second oil chamber 42 is very small in this state, the damping force generated by the damping valve 10 is also very small.

As the piston displacement speed increases, the leaves 10a bend downward from the outer rim of the washer 8 and the flow cross-sectional area of the working oil flowing out from the passages 2 into the second oil chamber 42 increases. The damping force generated by the damping valve 10 in this state depends on the elastic deformation of the leaves 10a, and increases sharply with respect to an increase in the piston displacement speed, as shown in the low speed region in FIG. 2.

Figure 2:
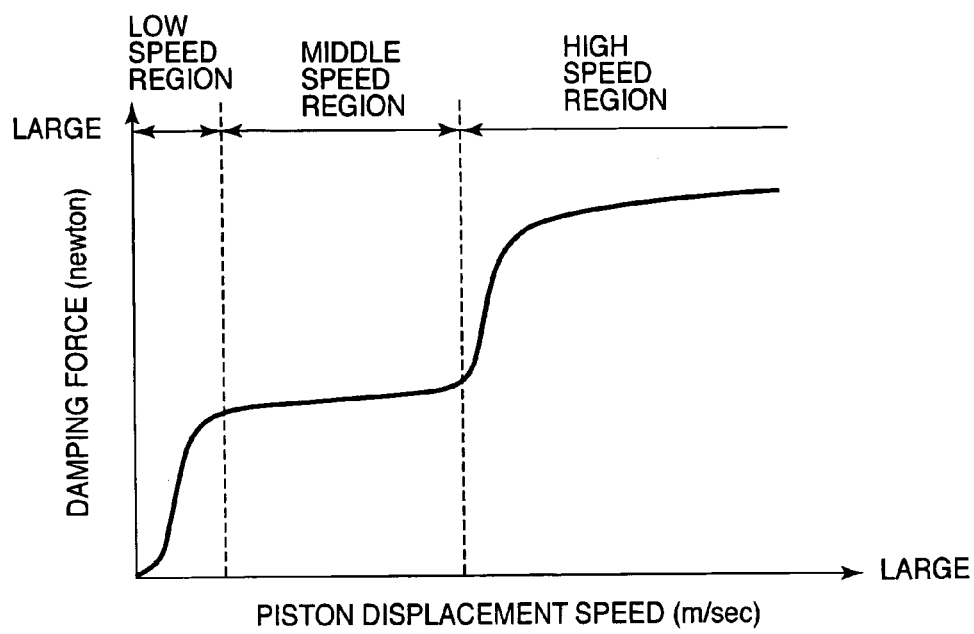
FIG. 2 is a diagram showing the characteristic of a damping force generated by the damping force generating mechanism.

When the piston displacement speed reaches the middle speed region, the differential pressure between the first oil chamber 41 and the second oil chamber 42 increases further, and the leaves 10a move downward in FIG. 1 against the resilient force of the coil spring 15. As the leaves 10a move downward, the flow cross-sectional area of the opening 3 of the passages 2 increases greatly. The distance between the leaves 1a and the opening 3 of the passages 2 increases as the piston displacement speed increases, and hence an increase in the damping force generated by the damping valve 10 in the middle speed region of piston displacement is much gentler than in the low speed region, as shown in FIG. 2.

When the piston displacement speed reaches the high speed region, the pressure-responsive throttle 16 displaces the spool 17 downward in FIG. 1 from the retreated position against the resilient force of the coil spring 25 and the pressure in the pressure chamber 26, causing the annular gap between the tip of the enlarged inner diameter part 17c and the slanted wall face 24d to narrow gradually. When the tip of the enlarged inner diameter part 17c is seated on the annular valve seat 24c, the flow of working oil from the first oil chamber 41 to the second oil chamber 42 via the annular gap is shut off.

According to the above action of the pressure responsive throttle 16, the damping force generated during the elongation stroke of the hydraulic shock absorber increases greatly immediately after the piston displacement speed reaches the high speed region. This rapid increase characteristic of the damping force can be set differently by selectively setting the gradient of the slanted wall face 24d of the partitioning member 24 in advance.

It should be noted that the spring load characteristic of the coil spring 25 is set in advance such that the enlarged inner diameter part 17c is seated on the annular valve seat 24c immediately after the piston displacement speed reaches the high speed region. According to this setting of the spring load of the coil spring 25, the pressure-responsive throttle 16 does not operate as long as the piston displacement speed stays in the middle speed region or low speed region. The damping force accompanying the flow of working oil from the first oil chamber 41 to the second oil chamber 42 in these speed regions is generated exclusively in the damping valve 10.

After the tip of the enlarged inner diameter part 17c of the spool 17 is seated on the annular valve seat 24c in the high speed region, the working oil in the first oil chamber 41 flows into the passages 2 only via the minute annular gap between the lower end 24e of the partitioning member 24 and the outer circumference of the upper end 1g of the piston 1. As a result, the pressure loss in the working oil flowing from the first oil chamber 41 to the second oil chamber 42 increases greatly with respect to an increase in the piston displacement speed.

According to this damping force generating mechanism, therefore, different damping force characteristics are obtained in the low speed region, the middle speed region, and the high speed region.

Further, by selectively setting the gradient of the slanted wall face 24d of the partitioning member 24 in advance, the rapid increase characteristic of the damping force immediately after the piston displacement speed reaches the high speed region can be set according to circumstances. This ability to set the damping force characteristics according to circumstances is favorable in preventing the driver or passengers of the vehicle from feeling discomfort or a shock.

Further, since the pressure chamber 26 is connected to the second oil chamber 42 via the orifice 23a, the pressure variation in the pressure chamber 26 always has a delay. Due to this delay, some time is required from the point at which the spool 17 starts to move until the tip of the enlarged inner diameter part 17c becomes seated on the annular valve seat 24c. This means that the increase in the damping force is gentler than in a case where the port 22e is not provided with the orifice 23a, and hence the orifice 23a also helps in protecting the driver or passengers of the vehicle from feeling discomfort or a shock due to a rapid change in the damping force.

The rapid increase characteristic of the damping force generated immediately after the piston displacement speed has reached the high speed region will now be described in detail.

Assuming that the slanted wall face 24d does not exist in the vicinity of the tip of the enlarged inner diameter part 17c, the annular gap which generates resistance against the flow of working oil is always formed between the tip of the enlarged inner diameter part 17c of the spool 17 and the annular valve seat 24c. When on the other hand the slanted wall face 24d exists in the vicinity of the tip of the enlarged inner diameter part 17c as shown in FIG. 1, the distance between the tip of the enlarged inner diameter part 17c of the spool 17 and the slanted wall face 24d becomes shorter than the distance between the tip of the enlarged inner diameter part 17c of the spool 17 and the annular valve seat 24c, and hence the annular gap formed between the tip of the enlarged inner diameter part 17c and the slanted wall face 24d is dominant in determining the magnitude of the generated damping force. In the former case, the damping force increases in a step like manner at the instant when the tip of the enlarged inner diameter part 17c becomes seated on the annular valve seat 24c. In the latter case, since the annular gap is smaller than in the former case at the same stroke position of the spool 17, a greater damping force is generated than in the former case. As a result, an increase in the generated damping force with respect to the displacement amount of the spool 17 in the latter case is gentler than in the former case.

Figure 3:
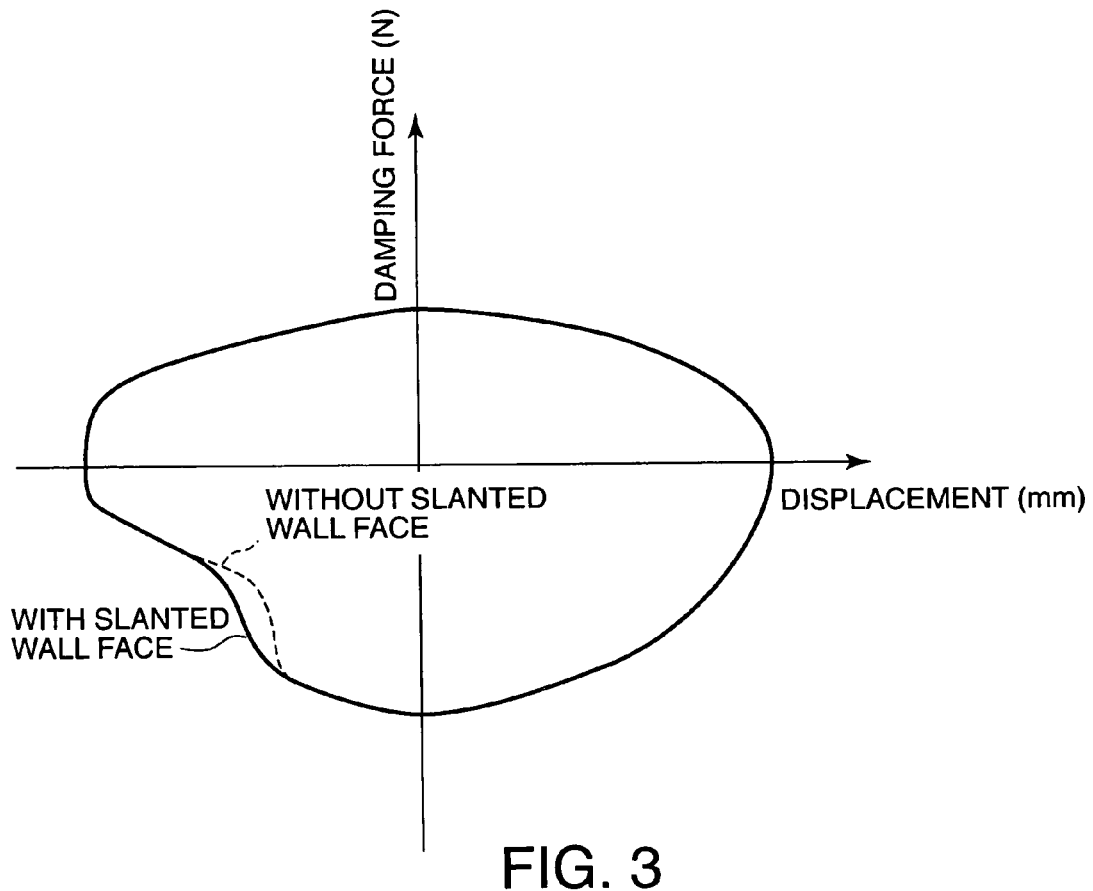
FIG. 3 is a diagram showing a relation between a stroke position of the shock absorber and the generated damping force.

FIG. 3 shows a relation between the damping force generated by the hydraulic shock absorber and the stroke position of the piston 1 in an operating situation. In the hydraulic shock absorber, the piston displacement speed reaches a maximum when it passes a neutral position, irrespective of the piston stroke direction, i.e., the elongation stroke or the contraction stroke. The maximum damping force is therefore generated in the neutral position. In contrast, in the most elongated position and the most contracted position of the shock absorber, the piston displacement speed becomes zero and the generated damping force also becomes zero. The dotted line in the figure denotes a damping force generated when the slanted wall face 24d does not exist in the vicinity of the tip of the enlarged inner diameter part 17c, and the solid line in the figure denotes a damping force generated when the slanted wall face 24d exists in the vicinity of the tip of the enlarged inner diameter part 17c.

As can be understood from the figure, by providing the slanted wall face 24d in the vicinity of the tip of the enlarged inner diameter part 17c, the rapid increase characteristic if the damping force immediately after the piston displacement speed reaches the high speed region can be made gentler. This action of the slanted wall face 24d, in association with an effect brought about by a time delay in pressure variation in the pressure chamber 26 due to the orifice 23a, brings a particularly favorable effect in terms of preventing noise and discomfort to the driver or passengers due to a rapid change in the damping force of the shock absorber.

On the other hand, when the piston 1 displaces downward in FIG. 1 in the cylinder 40, or in other words when the shock absorber contracts, the second oil chamber 42 shrinks and the first oil chamber 41 expands. According to this action, the working oil in the second oil chamber 42 flows into the first oil chamber 41 via the passages 1d, and the damping valve 100 generates a damping force by applying a flow resistance to the flow of working oil through the passages 1d.

Various variations are possible with respect to this embodiment.

According to this embodiment, the lower end 24e of the partitioning member 24 is located in the vicinity of the outer circumference of the upper end 1g of the piston 1 such that a minute annular gap left therebetween is used as the second flow path of the working oil that flows from the first oil chamber 41 into the inflow space A after the spool 17 is seated on the annular valve seat 24c. However, the lower end 24 of the partitioning member 24 may be disposed in the vicinity of the inner circumference of the cylinder 40 such that a minute gap formed between the lower end 24 of the partitioning member 24 and the inner circumference of the cylinder 40 is used as the second flow path of the working oil that flows from the first oil chamber 41 into the inflow space A.

Figure 4:
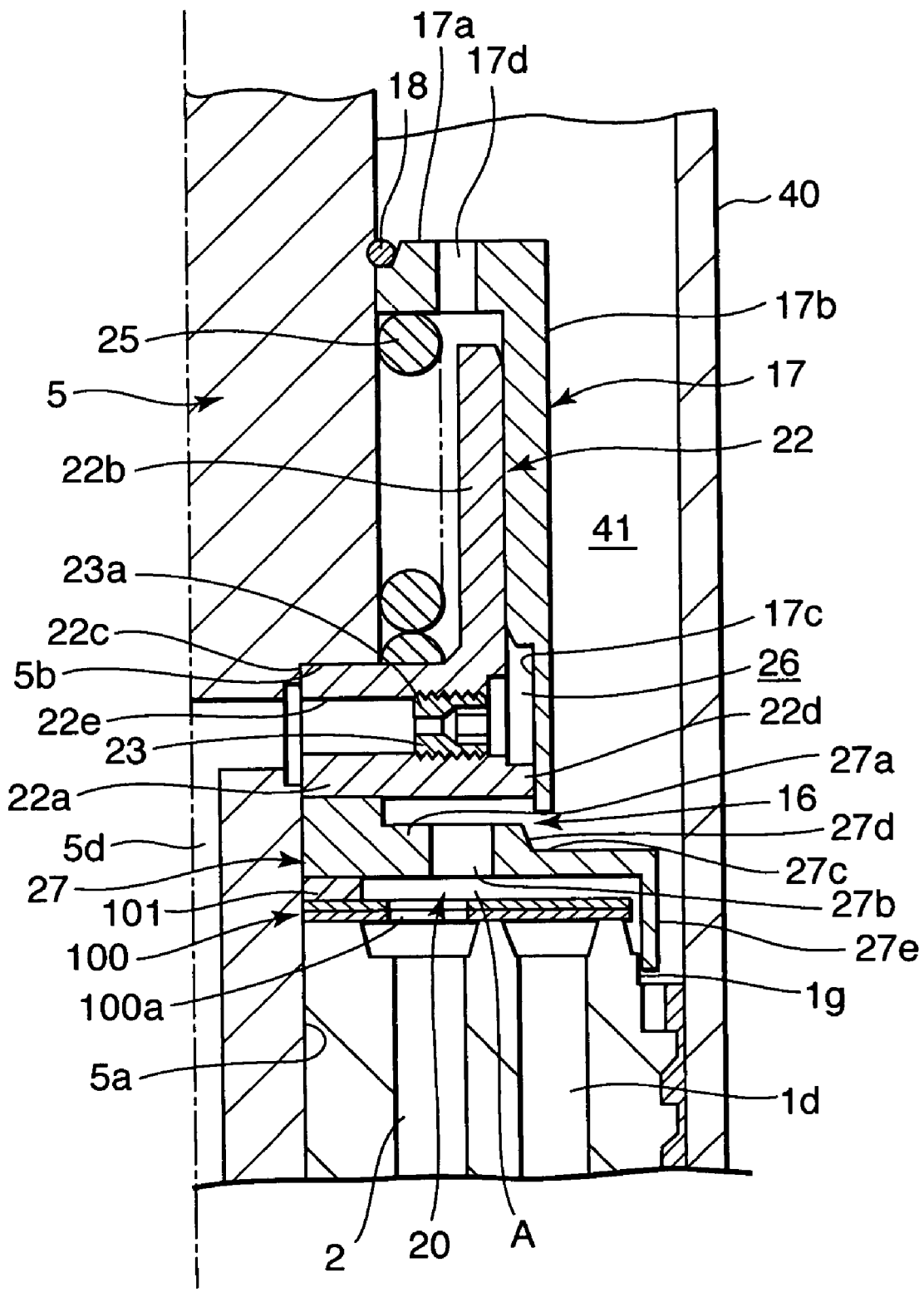
FIG. 4 is an enlarged longitudinal sectional view of essential parts of a shock absorber showing a variation of the damping force generating mechanism.

Referring to FIG. 4, the partitioning member 24 may be replaced by a partitioning member 27 which has a slanted wall face 27d on the inside of an annular valve seat 27c. The partitioning member 27 further comprises a main body 27a, communicating holes 27b, and a lower end 27e extending downward from the outer circumference of the main body 27a. The slanted wall face 27d is formed into a conical shape and disposed on the inside of the annular valve seat 27c and on the outside of the communicating holes 27b. The lower end 27e reaches the vicinity of the outer circumference of the upper end 1g of the piston 1.

Figure 5:
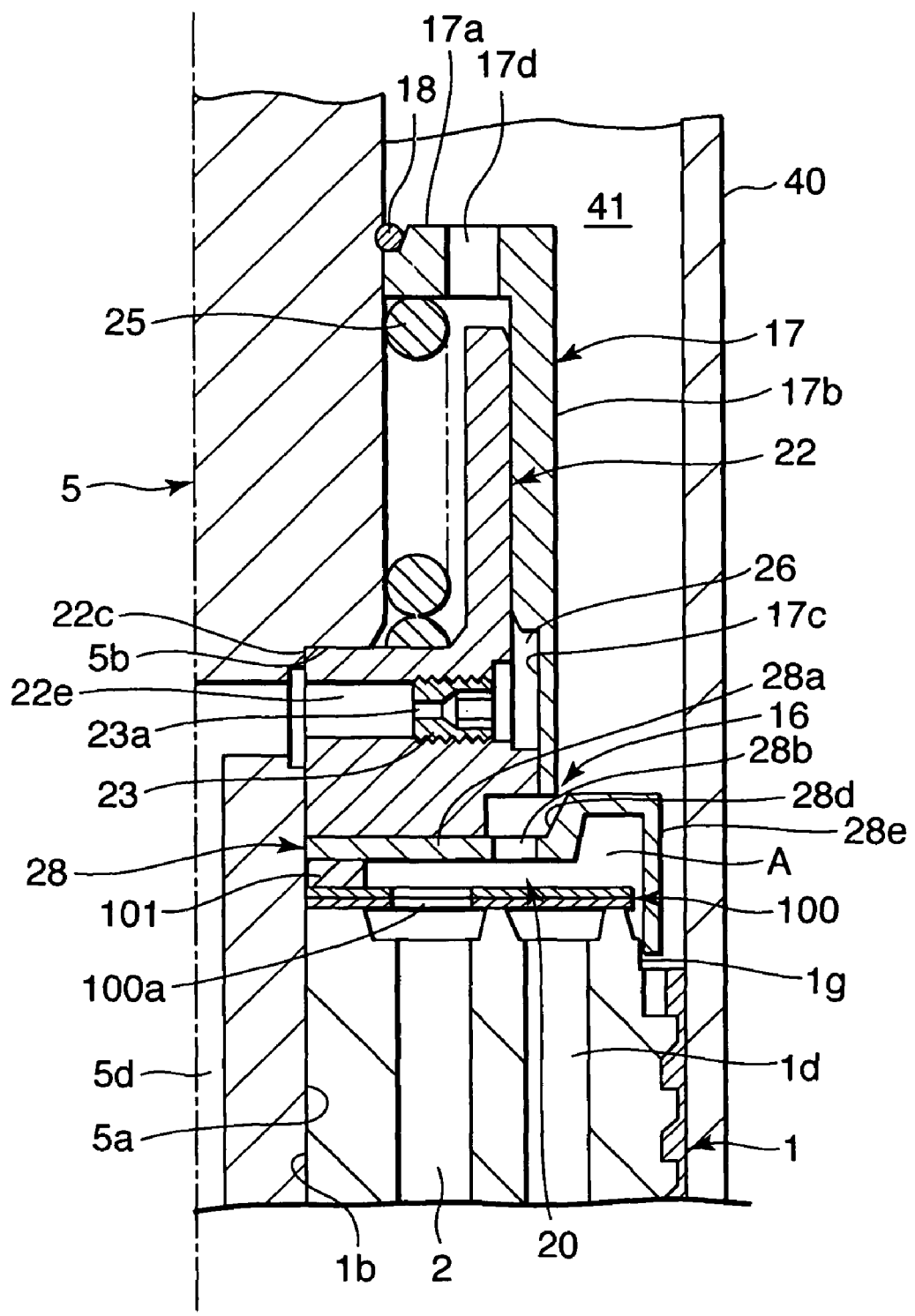
FIG. 5 is an enlarged longitudinal sectional view of essential parts of a shock absorber showing another variation of the damping force generating mechanism.

Referring to FIG. 5, the partitioning member 24 may be replaced by a partitioning member 28 in which the annular valve seat is omitted and the tip of the enlarged inner diameter part 17c of the spool 17 is seated directly on a slanted wall face 28d. A circular recess formed on the upper end face 28a and communicating holes 28b formed in the vicinity of the slanted wall face 28d are equivalent respectively to the recess formed on the upper end face 24a and the communicating holes 24b of the partitioning member 24. A lower end 28c of the partitioning member 28 has a shape and function equivalent to those of the lower end 24e of the partitioning member 24.

It is also possible to omit the annular valve seat 27c from the partitioning member 27 shown in FIG. 5 such that the tip of the enlarged inner diameter part 17c of the spool 17 is seated directly on the slanted wall face 27d.

Figure 6:
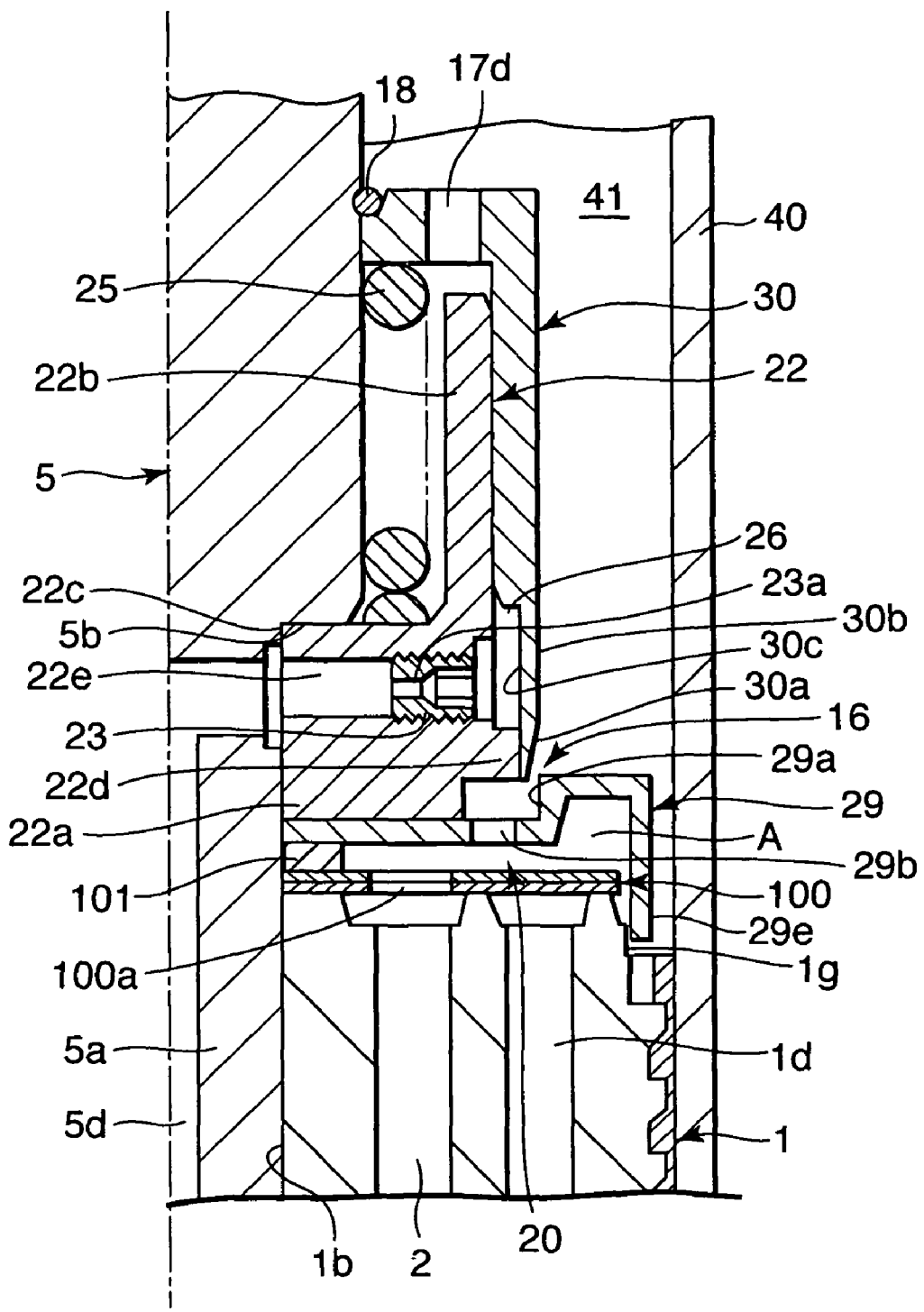
FIG. 6 is an enlarged longitudinal sectional view of essential parts of a shock absorber showing yet another variation of the damping force generating mechanism.

Referring to FIG. 6, instead of the combination of the spool 17 and the partitioning member 24, a spool 30 having a tapered face 30a on the outer circumference of a lower end of an enlarged inner diameter part 30c may be used together with a partitioning member 29 which has a recess surrounded by an upright wall face 29a. The shape and function of the communicating holes 29b formed in the vicinity of the upright wall face 29a and a lower end 29e of the partitioning member 29 are equivalent to those of the communicating holes 24b and the lower end 24e of the partitioning member 24.

According to the combination of the spool 30 and the partitioning member 29, an effect of smoothing out the increase characteristic of the generated damping force with respect to an increase in the displacement amount of the spool 17 is obtained by causing the tapered face 30a to approach the upright wall surface 20d steadily as the pool 30 displaces, as in the case where the tip of the enlarged inner diameter part 17c of the spool 17 approaches the slanted wall face 24d of the partitioning member 24 shown in FIG. 1.

All the partitioning members 24 and 27-29 are arranged to form a minute annular gap between the lower end thereof and the outer circumference of the upper end 1g of the piston 1, thereby forming a the second flow path to ensure a flow of working oil from the first oil chamber 41 into the inflow space A after the spool 17 (30) is seated on the partitioning member 24 (27-29). A similar function may be derived from a notch or notches formed on the tip of the enlarged inner diameter part 17a, 30a of the spool 17, 30. The notch(es) enables a small amount of working oil to flow from the first oil chamber 41 into the inflow space A even when the spool 17 (30) is seated on the partitioning member 24 (27-29), thereby allowing the partitioning member 24 (27-29) to be fitted tightly onto the outer circumference of the upper end 1g of the piston 1 without clearance.

Figure 7:
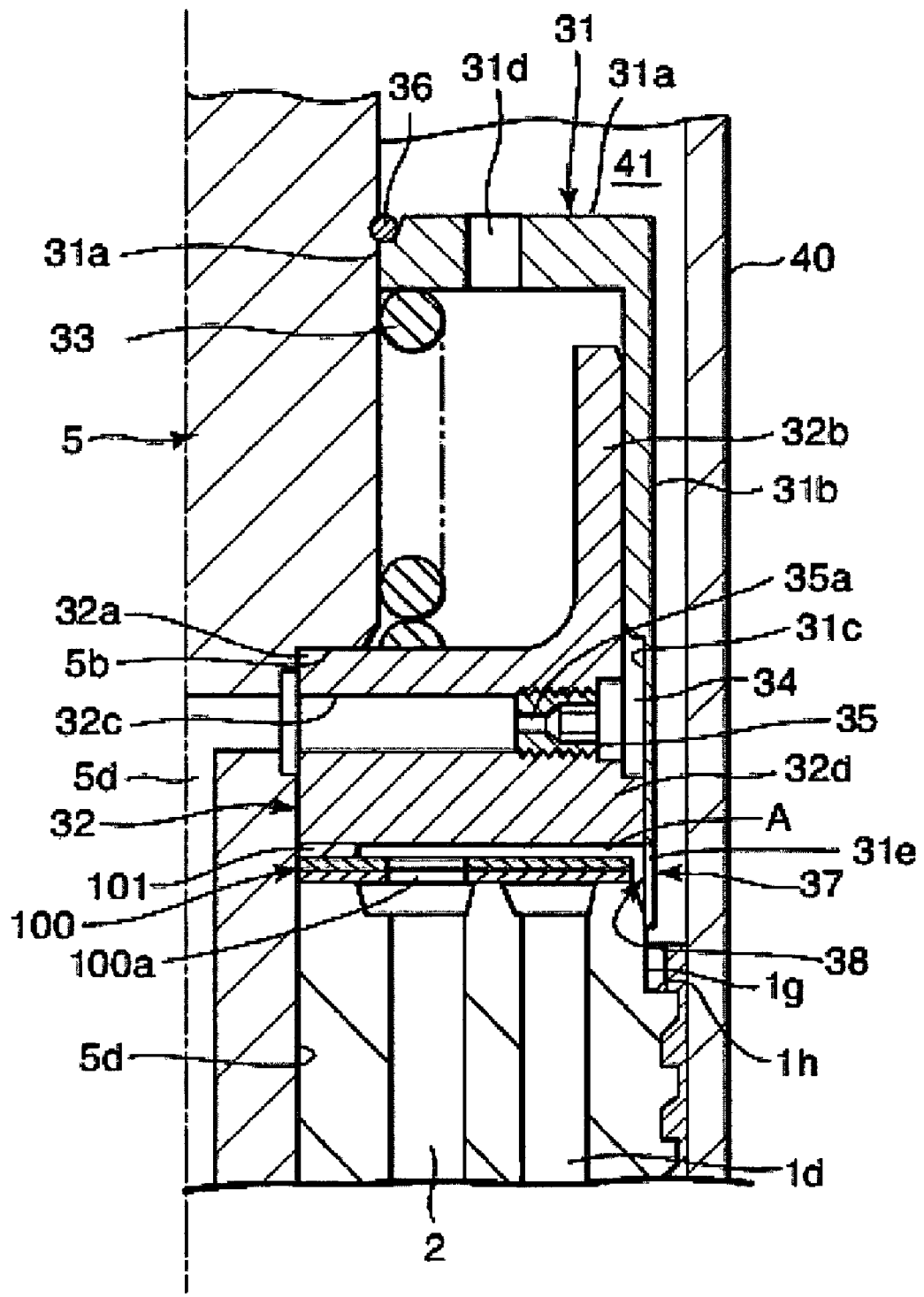
FIG. 7 is a longitudinal sectional view of essential parts of a shock absorber including a damping force generating mechanism according to a second embodiment of this invention.

Next, referring to FIG. 7, a second embodiment of this invention will be described.

A damping force generating mechanism according to this embodiment comprises a pressure responsive throttle 37 comprising a pressure chamber partitioning member 32 and a spool 31, instead of the pressure responsive throttle 16.

The pressure chamber partitioning member 32 is gripped between the washer 101 fitted onto the small diameter part 5a of the piston rod 5 and the step 5b formed on the piston rod 5. The pressure chamber partitioning member 32 is formed into a cylindrical shape having a bottom portion 32a which the small diameter part 5a penetrates. The pressure chamber partitioning member 32 further comprises a cylindrical portion 32b projecting upward from the bottom portion 32a and a flange portion 32d projecting radially from the bottom portion 32a.

The spool 31 is fitted onto the outer circumference of the piston rod 5 so as to be free to slide in the axial direction. The spool 31 comprises a bottom 31a, the center of which is penetrated by the piston rod 5, and a cylindrical part 31b projecting downward from the outer circumference of the bottom 31a. The cylindrical part 31b is fitted onto the outer circumference of the cylindrical portion 32b of the pressure chamber partitioning member 32. An enlarged inner diameter part 31c is formed on the inside of the lower end of the cylindrical part 31b. The enlarged inner diameter part 31c is fitted onto the outer circumference of the flange portion 32d of the pressure chamber partitioning member 32 such that the tip of the enlarged inner diameter part 31c overlaps the outer circumference of the upper end 1g of the piston 1 as the spool 31 displaces downward. Slits 31e are formed on the tip of the enlarged inner diameter part 31c.

According to the above construction, a pressure chamber 34 having a ring-shaped horizontal cross-section is formed between the enlarged inner diameter part 31c of the spool 31 and the cylindrical portion 32b of the pressure chamber partitioning member 32. The pressure chamber partitioning member 32 also functions as a partitioning member which delimits the inflow space A to the passages 2 from the first oil chamber 41. As a result, the partitioning member 24 of the first embodiment is herein omitted.

To introduce the pressure of the second oil chamber 42 into the pressure chamber 34, a pilot passage 5d is formed to penetrate the small diameter part 5a of the piston rod 5. In the pressure chamber partitioning member 32, a port 32c is formed in the radial direction to connect the pilot passage 5d to the pressure chamber 34. An orifice 35a is provided in the port 32c. The orifice 35a is formed in a plug 35 screwed into the inner circumference of the port 32c.

A coil spring 33 is interposed between the spool 31 and the pressure chamber partitioning member 32 around the piston rod 5. An upper end of the coil spring 33 is supported by the bottom 31a of the spool 31. A lower end of the coil spring 33 is supported by the bottom portion 32a of the pressure chamber partitioning member 32.

The coil spring 33 applies a resilient force to the spool 31 in a direction that causes the spool 31 to retreat from the piston 1, or in other words a direction for supplementing the action of the pressure in the pressure chamber 34. Displacement of the spool 31 in this direction is limited by a stop ring 36 fitted onto the outer circumference of the piston rod 5.

A space accommodating the coil spring 33 is surrounded by the spool 31, the piston rod 5, and the pressure chamber partitioning member 32. This space is connected permanently to the first oil chamber 41 via a communication hole 31d penetrating the bottom 31a of the spool 31, thereby preventing the working oil in the space from locking the axial displacement of the spool 21.

The pressure in the first oil chamber 41 acts downward on the pressure receiving area of the spool 31 exposed upward in the first oil chamber 41. In contrast, the pressure in the pressure chamber 34 and the resilient force of the oil spring 33 act upward on the spool 31. The spool displaces in a direction to cause the tip of the enlarged inner diameter part 31c to approach the outer circumference of the upper end 1g of the piston 1 as the piston displacement speed in the elongation direction increases, thereby reducing the annular gap between the tip of the enlarged inner diameter part 31c and the outer circumference of the upper end 1g of the piston 1. As a result, the flow resistance of the working oil flowing into the inflow space A from the first oil chamber 41 via the annular gap increases. After the tip of the enlarged inner diameter part 31c overlaps the outer circumference of the upper end 1g of the piston 1, the oil can flow from the first oil chamber 41 into the inflow space A only through the slits 31e formed in the tip of the enlarged inner diameter part 31c, and hence the working oil flowing from the first oil chamber 41 to the second oil chamber 42 is subjected to large resistance. As the spool 31 displaces further downward, the flow cross-sectional area of the slits 31e decreases further. The flow resistance reaches a maximum when the tip of the enlarged inner diameter part 31c becomes seated on a step 1h formed on the upper end 1g of the piston 1. It should be noted that the vertical length of the slits 31e is set in advance such that the slits 31e are not blocked entirely by the outer circumference of the upper end 1g of the piston 1 even when the tip of the enlarged inner diameter part 31c is seated on the step 1h.

Also according to this damping force generating mechanism, different damping force characteristics are obtained when the piston displacement speed is in the low speed region, the middle speed region, and the high speed region, respectively. Further, the damping force characteristic in the high speed region of piston displacement can be altered by altering the shape, the size, or the number of the slits 31e. According to this embodiment, therefore, setting the damping force characteristic in the high speed region is easier than in the first embodiment in which the damping force characteristic in the same high speed region is dependent on the minute annular gap.

Figure 8:
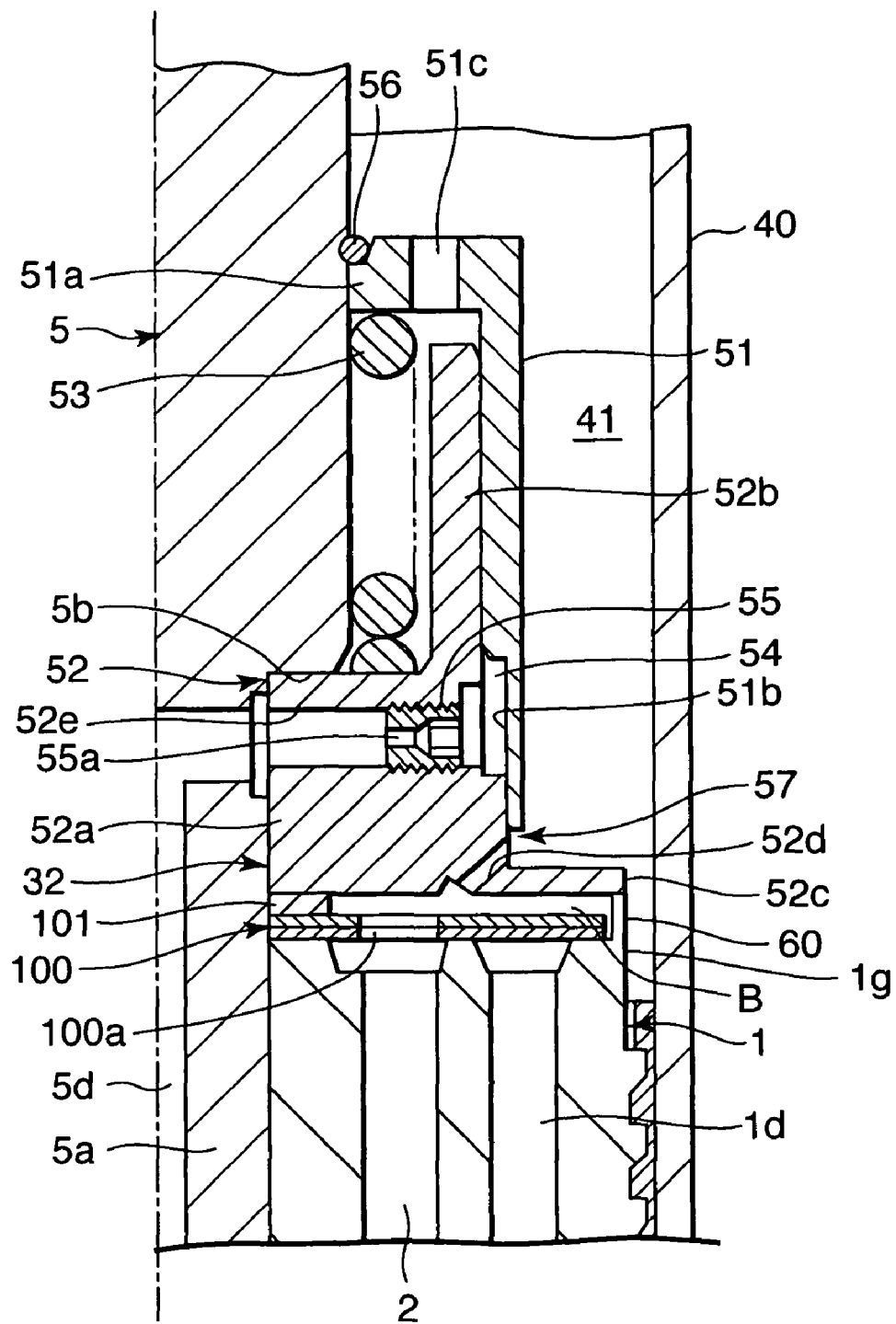
FIG. 8 is a longitudinal sectional view of essential parts of a shock absorber including a damping force generating mechanism according to a third embodiment of this invention.

Referring to FIG. 8, a third embodiment of this invention will be described. This invention corresponds to the damping force generating mechanism of the second embodiment in which the pressure responsive throttle 37 is replaced by a pressure responsive throttle 57.

The pressure responsive throttle 37 increases the generated damping force in the high speed region of piston displacement by causing the tip of the enlarged inner diameter part 31c of the spool 31 to overlap the outer circumference of the upper end 1g of the piston 1. In contrast, the pressure responsive throttle 57 according to this embodiment obtains the same result by causing a tip of an enlarged inner diameter part 51b of a spool 51 to close communicating holes 52d formed though a pressure chamber partitioning member 52.

An annular weir 60 projecting upward is formed on the outer circumference of the upper end 1g of the piston 1. The pressure chamber partitioning member 52 comprises a flange 52c which is located just above the annular weir 60 such that an inflow space B into the passages 2 is formed above the damping valve 100. The communicating holes 52d penetrate the bottom 52a of the pressure chamber partitioning member 52 diagonally to connect the first oil chamber 41 to the inflow space B. When the piston displacement speed reaches the high speed region, the spool 51 displaces downward and the tip of the enlarged inner diameter part 51b starts to close the communicating holes 52d. A minute annular gap is provided between the flange 52c and the annular weir 60 in advance such that, after the communicating holes 52d are closed in the high speed region of piston displacement speed, working oil flows from the first oil chamber 41 into the inflow space B only through this minute annular gap.

The other components of this embodiment are equivalent to the corresponding components of the second embodiment. Specifically, a bottom 51a and a communication hole 51c of the spool 51 are equivalent to the bottom 31a and the communication hole 31d of the spool 31. A cylindrical portion 52b and a port 52e of the pressure chamber partitioning member 52 correspond to the cylindrical portion 32b and the port 32e, respectively. A coil spring 53 corresponds to the coil spring 33. A pressure chamber 54 corresponds to the pressure chamber 34. A plug 55 and an orifice 55a correspond to the plug 35 and the orifice 35a, respectively. A stop ring 56 corresponds to the stop ring 36

With this pressure responsive throttle 57, when the piston displacement speed reaches the high speed region, the spool 52 gradually reduces the opening area of the ports 52d as the piston displacement speed increases, and after the spool 52 closes the ports 52, only the minute annular gap between the flange 52c and the annular weir 60 allows working oil to flow from first oil chamber 41 into the inflow space B.

Also according to this embodiment, damping forces of different characteristics are generated according to the speed regions of piston displacement, i.e., the low speed region, the middle speed region, and the high speed region, as in the case of the second embodiment.

Further, according to this embodiment, a decreasing gain of the flow cross-sectional area of the communicating holes 52d with respect to the displacement amount of the spool 51 is smaller than in the case of the pressure responsive throttle 37 which is designed to decrease the annular gap. In other words, a decrease in the flow cross-sectional area with respect to an increase in the differential pressure between the first oil chamber 41 and the second oil chamber 42 can be made gentler than in the second embodiment. It should be noted that instead of having a plurality of communicating holes 52, the pressure chamber partitioning member 52 may have a single communicating hole 52.

Figure 9:
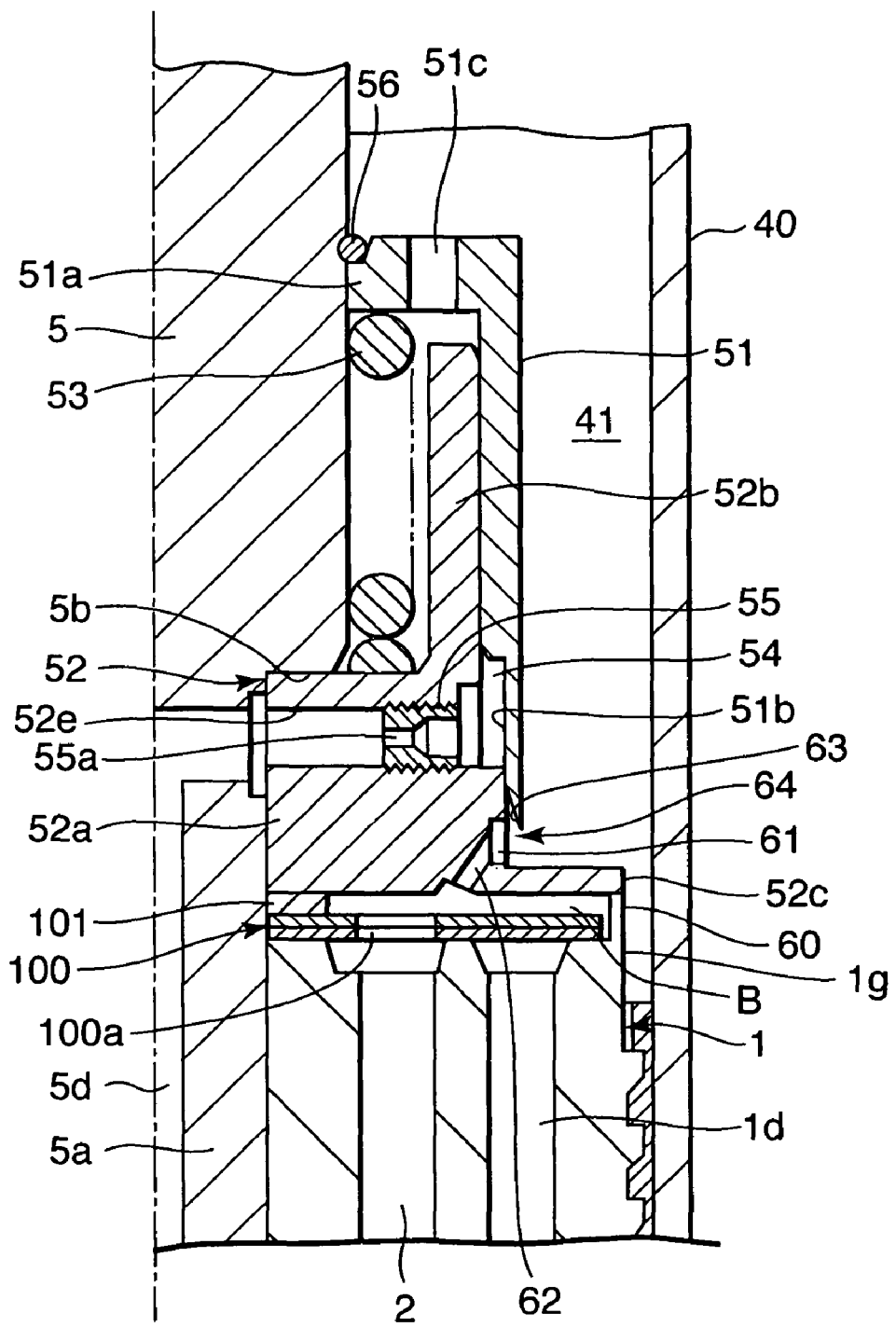
FIG. 9 is a longitudinal sectional view of essential parts of a shock absorber including a damping force generating mechanism according to a fourth embodiment of this invention.
Figure 10:
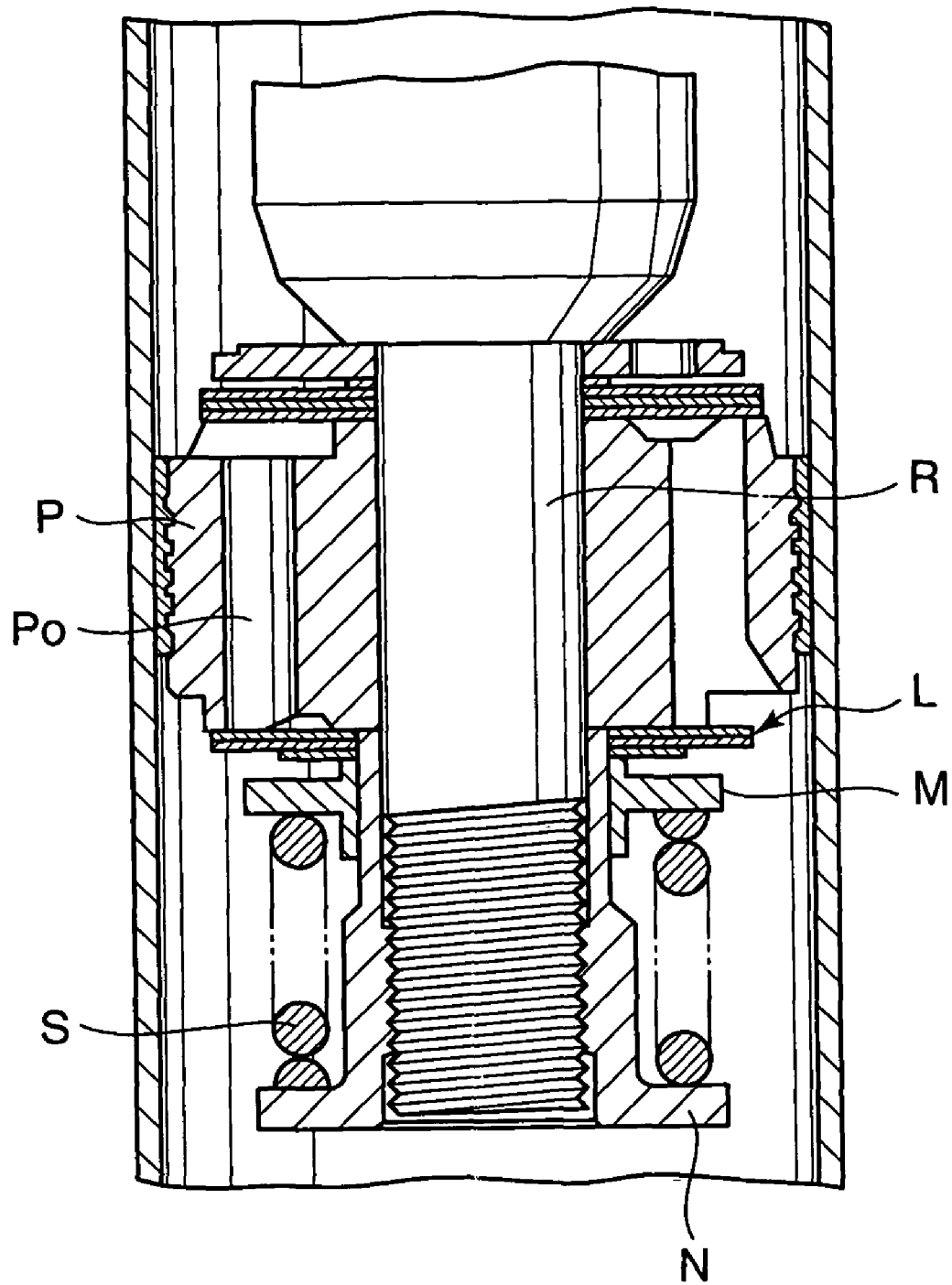
FIG. 10 is a longitudinal sectional view of essential parts of a shock absorber including a damping force generating mechanism according to the prior art.
Figure 11:
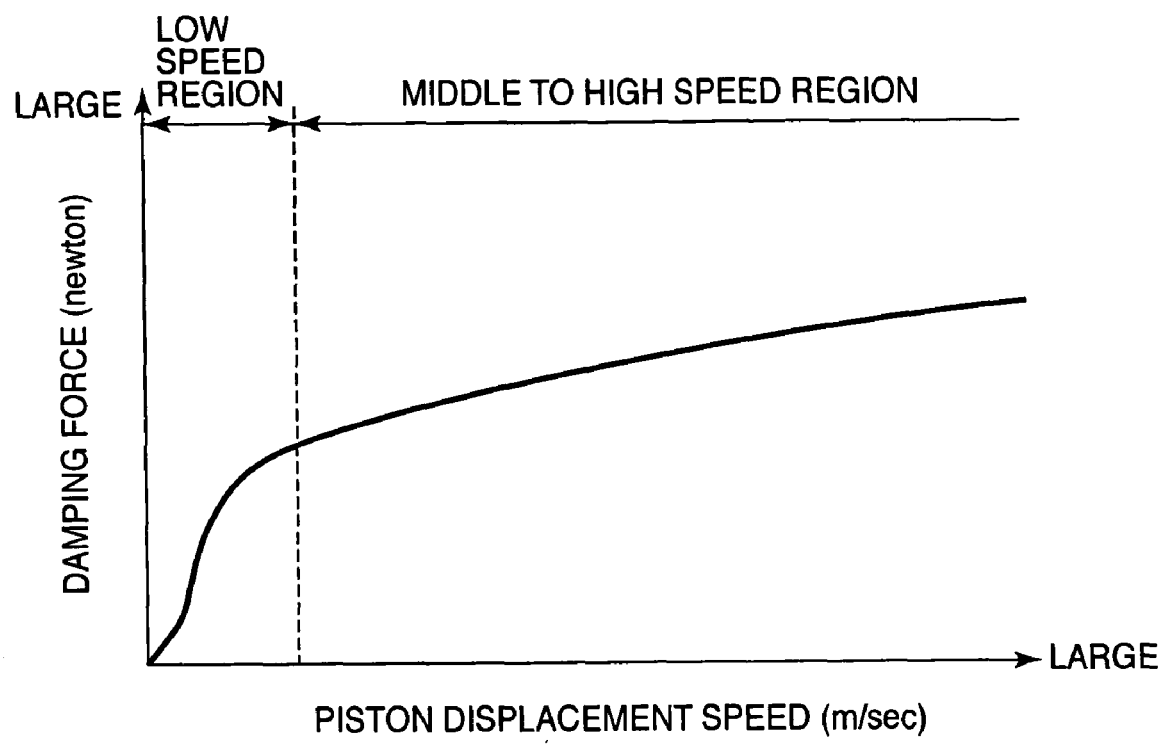
FIG. 11 is a diagram showing the characteristic of a damping force generated by the damping force generating mechanism according to the prior art.

Referring to FIG. 9, a fourth embodiment of this invention will be described.

A damping force generating mechanism according to this embodiment is provided with a pressure responsive throttle 64. The pressure responsive throttle 64 corresponds to the pressure responsive throttle 57 according to the third embodiment, to which an annular groove 61 and a tapered face 63 are further provided. Communicating holes 62 correspond to the communicating holes 52 of the pressure responsive throttle 57, but communicate with the first oil chamber 41 via the annular groove 61 which is formed on the outer circumference of the bottom 52a of the pressure chamber partitioning member 52. The tapered face 63 is formed on the tip of the enlarged inner diameter part 51c of the spool 51, and enlarges a diameter of the enlarged inner diameter part 51c downward. The other components of the damping force generating mechanism are equivalent to those of the damping force generating mechanism according to the third embodiment.

The pressure responsive throttle 64 provided with the annular groove 61 and the tapered face 63 can further reduce the decreasing gain of the flow cross-sectional area with respect to the stroke position of the spool 51 in comparison with the pressure responsive throttle 57 according to the third embodiment.

As described above, the damping force generating mechanism according to this invention generates damping forces of different characteristics depending on the piston displacement speed region, e.g., the low speed region, the middle speed region, and the high speed region. Further, the damping force generating mechanism according to this invention can vary a decrease gain of the flow sectional area when the piston displacement speed reaches the high speed region, thereby enabling arbitrary setting of the rapid increase characteristic of the damping force when the piston displacement speed reaches the high speed region.

The contents of Tokugan 2006-348838, with a filing date of Dec. 26, 2006 in Japan are hereby incorporated by reference.

Although the invention has been described above with reference to certain embodiments of the invention, the invention is not limited to the embodiments described above. Modifications and variations of the embodiments described above will occur to those skilled in the art, within the scope of the claims.

For example, this invention does not depend on the construction of the damping valve. The damping force generating mechanism according to this invention can be applied to a shock absorber having a damping valve which varies a generated damping force depending only on the elastic deformation of a leaf valve, the inner circumference of which is fixed. In this case also, the damping force characteristic in the high speed region of piston displacement can be varied independently from the other speed regions.

In the embodiments described above, the damping force generating mechanism is applied for varying the damping characteristic during the elongation stroke of a shock absorber, but the damping force generating mechanism according to this invention may also be applied to vary the damping force characteristic during the contraction stroke of a shock absorber.

In the embodiments described above, the valve disk is constituted by the piston 1, but it is possible to constitute the valve disk by a base valve which is fixed to the bottom of the cylinder 40 to separate the second oil chamber 42 from a reservoir provided outside the cylinder 40. In this case the second oil chamber 42 and the reservoir correspond to the first fluid chamber and the second fluid chamber, respectively.

The passages 2 may be replaced by a single passage. Similarly, the communicating holes 24b, 27b, 28d, 29b may be replaced by a single communicating hole.

The embodiments of this invention in which an exclusive property or privilege is claimed are defined as follows:

What is claimed is:

1. A damping force generating mechanism for a shock absorber which comprises a first fluid chamber, a second fluid chamber, a valve disk which separates the first fluid chamber from the second fluid chamber, and a passage formed through the valve disk to connect the first fluid chamber to the second fluid chamber, comprising:
   a damping valve which exerts a resistance on a fluid flowing in the passage from the first fluid chamber to the second fluid chamber;
   a partitioning member which covers the valve disk and partitions an inflow space into the passage in the first fluid chamber;
   a flow path connecting the first fluid chamber and the inflow space, the flow path including a first flow path portion and a second flow path portion, the second flow path portion being formed by the partitioning member and facing the outer circumference of the valve disk so as to allow fluid to flow from the first fluid chamber into the inflow space;
   a spool which decreases a flow cross-sectional area of the first flow path portion when a fluid pressure in the first fluid chamber increases beyond a fluid pressure in the second fluid chamber by more than a predetermined pressure, the spool having a first pressure receiving area which receives a pressure in the first fluid chamber and a second pressure receiving area which receives a pressure in the second fluid chamber;
   a pressure chamber into which the pressure in the second pressure chamber is introduced, the pressure chamber facing the second pressure receiving area;
   an orifice interposed in an introduction path of the fluid pressure from the second fluid chamber to the pressure chamber; and
   a spring which pushes the spool in an identical direction to the pressure in the pressure chamber, wherein
   the second flow path portion allows the fluid to flow from the first fluid chamber into the inflow space even when the first flow path portion is closed by the spool.

2. The damping force generating mechanism as defined in claim 1, wherein the second flow path portion comprises an annular gap formed between the outer circumference of the valve disk and the partitioning member.

3. The damping force generating mechanism as defined in claim 2, wherein the partitioning member comprises a communicating hole, and an annular valve seat disposed on a side of the partitioning member opposite to the inflow space so as to surround the communicating hole, and the spool is constituted by a cylindrical member which faces the annular valve seat.

4. The damping force generating mechanism as defined in claim 3, wherein the annular valve seat is formed in a slanted wall face inclined with respect to the displacement direction of the spool.

5. The damping force generating mechanism as defined in claim 3, wherein the partitioning member comprises a conical shaped wall face, in the vicinity of the annular valve seat.

6. The damping force generating mechanism as defined in claim 3, wherein the partitioning member comprises an upright wall in the vicinity of the annular valve seat, and the spool comprises a conical shaped slant face which varies in distance from the upright wall face as the spool approaches the annular valve seat.

7. The damping force generating mechanism as defined in claim 1, wherein the partitioning member comprises a communicating hole which connects the first fluid chamber and the inflow space, and the spool is configured to cover an opening of the communicating hole facing the first fluid chamber.

8. The damping force generating mechanism as defined in claim 6, wherein the opening of the communicating hole facing the first fluid chamber is formed in the shape of an annular groove, and the spool comprises a tapered face which covers the annular groove.

9. The damping force generating mechanism as defined in claim 1, wherein the damping valve comprises a leaf valve disposed at the opening of the passage into the second fluid chamber, and the leaf valve is configured to increase a flow cross-sectional area by deforming according to a differential pressure between the passage and the second fluid chamber and further increase the flow cross-sectional area by displacing in a direction to detach from the opening when the differential pressure between the passage and the second fluid chamber is greater than a set value.

10. The damping force generating mechanism as defined in claim 1, wherein the valve disk comprises a piston enclosed in a cylinder so as to be free to slide, and the first fluid chamber is a chamber the volume of which decreases as the piston performs an elongation stroke.

11. The damping force generating mechanism as defined in claim 1, wherein the second flow path portion comprises a slit formed in the spool so as to allow fluid in the first fluid chamber to flow into the inflow space in a state where the spool closes the first flow path.

\* \* \* \* \*